United States Patent [19]

Burger

[11] 4,173,012
[45] Oct. 30, 1979

[54] DECELERATION WARNING INDICATOR

[76] Inventor: Charles H. Burger, P.O. Box 86, Lovingston, Va. 22949

[21] Appl. No.: 873,984

[22] Filed: Jan. 31, 1978

[51] Int. Cl.² .......................... B60Q 1/44; H01H 3/14
[52] U.S. Cl. ................................ 340/71; 200/61.45 R; 200/61.89; 340/669
[58] Field of Search .......................... 340/71, 66, 669; 200/61.45, 61.53, 61.71

[56] References Cited

U.S. PATENT DOCUMENTS

| | | | |
|---|---|---|---|
| 2,716,678 | 8/1955 | Randol | 200/61.89 |
| 2,918,652 | 12/1959 | Epstein | 340/669 X |
| 3,105,884 | 10/1963 | Cottrell | 200/61.89 |
| 3,286,056 | 11/1966 | Spong | 200/61.89 |
| 3,497,871 | 2/1970 | Damico | 340/71 |
| 3,596,020 | 7/1971 | Warren | 340/66 |
| 3,659,268 | 4/1972 | Crawford | 340/71 |
| 3,881,078 | 4/1975 | Kazanecki | 200/61.89 |

*Primary Examiner*—Donald J. Yusko
*Attorney, Agent, or Firm*—David H. Semmes

[57] ABSTRACT

A deceleration warning indicator adapted for use in automotive vehicles of the type having a throttle rod extending intermediate an accelerator foot pedal and the engine carburetor. The system includes an energized electrical circuit and a deceleration movement of the throttle rod, as the vehicle operator releases foot pressure from the accelerator. The system is characterized by its simplicity and ease of installation and includes an independently mounted reciprocable switch closable with a throttle rod projection to activate the warning lamp.

1 Claim, 5 Drawing Figures

DECELERATION WARNING INDICATOR

SCHEMATIC DWG

DECELERATION WARNING INDICATOR

CROSS-REFERENCES TO RELATED APPLICATIONS

None.

BACKGROUND OF THE INVENTION

1. Field of the Invention

Automotive vehicles, particularly deceleration warning lamp indicators of the type mounted to vehicle rear brake systems, turn indicators, flasher warning systems or an independently mounted warning lamp.

2. Description of the Prior Art

Being separately submitted under the provision of 37 C.F.R. 1.97.

SUMMARY OF THE INVENTION

According to the present invention, the deceleration warning indicator consists of a suitably energized electrical circuit having a deceleration warning lamp. The lamp may be located within a conventional brake light system, turn indicator or flasher warning lamp or may be an independent lamp mounted, for example, in the rear window of the vehicle. A housing is supported within the vehicle so as to enclose an intermediate portion of the throttle rod which extends from accelerator foot pedal to the carburetor. The throttle rod includes at least two longitudinally spaced, radial projections longitudinally reciprocable with the throttle rod within said housing. As the vehicle accelerates, and the throttle rod is moved, the projections engage in relocating a switch. As the vehicle decelerates one of the projections engages, so as to close the switch, thereby activating the warning lamp.

DESCRIPTION OF THE PREFERRED EMBODIMENT

As illustrated in FIGS. 1-4, the present system may be constructed so as to encompass an intermediate portion of a vehicle throttle rod extending from the accelerator foot pedal to the carburetor (not illustrated). The system may be encompassed within a housing which is independently supported within the vehicle.

Figure 1:
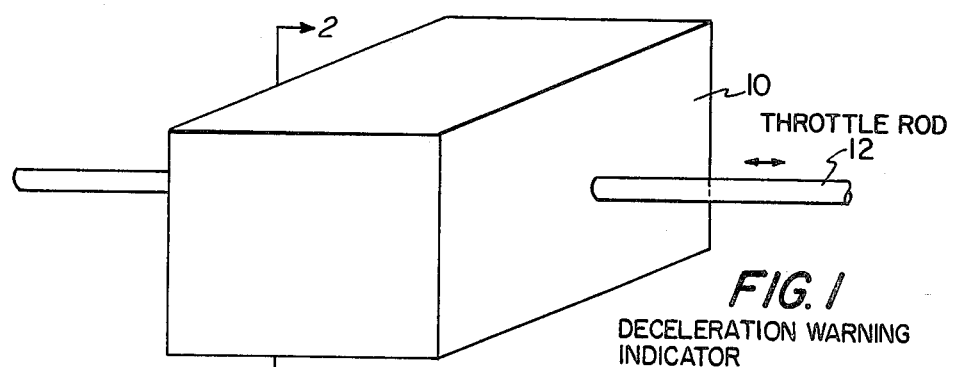
FIG. 1 is a perspective view of a proposed housing ecompassing the vehicle throttle rod.
Figure 2:
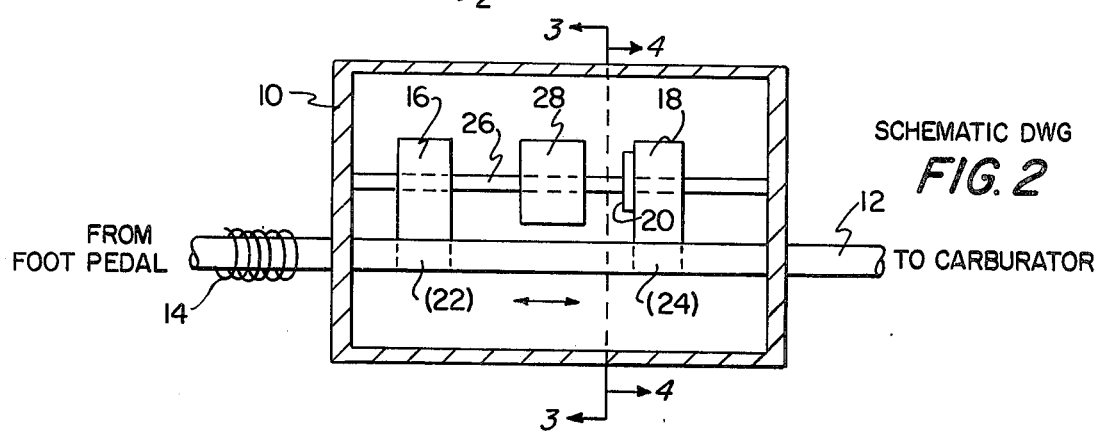
FIG. 2 is a longitudinal section, taken along section line 22 of FIG. 1.

As illustrated in FIG. 2 that intermediate portion of throttle rod 12 extending through housing 10 includes radial projections or lugs 16, 18 which may be adjustably attached to rod 12 at 22 and 24, thereby reciprocating longitudinally with throttle rod 12 during acceleration movement or deceleration return. Throttle rod 12 may include conventional tension spring 14 or like mechanism for deceleration return.

Figure 3:
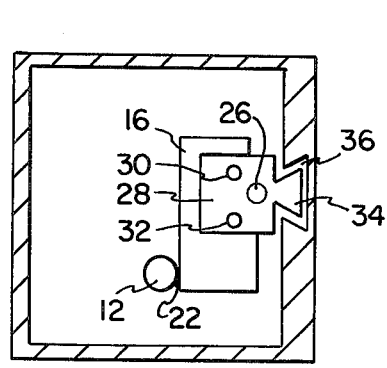
FIG. 3 is a transverse section taken along section line 33 at FIG. 2.
Figure 4:
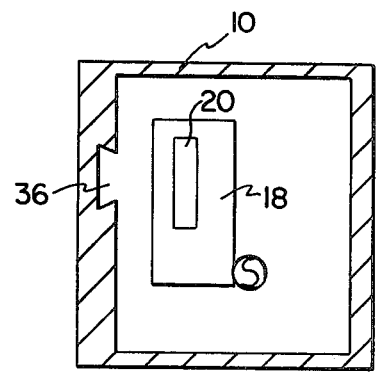
FIG. 4 is a transverse section, taken along section line 44 of FIG. 2.
Figure 5:
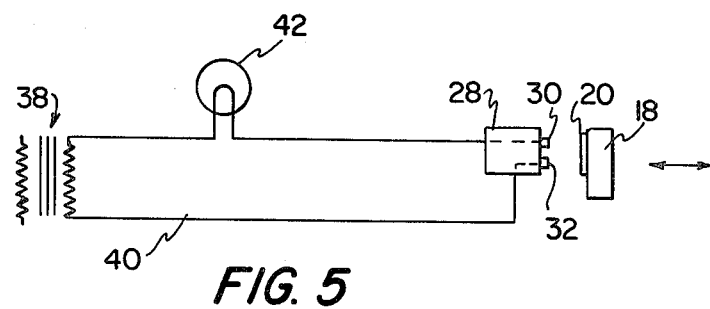
FIG. 5 is a circuit diagram of the proposed system.

As illustrated in FIGS. 2 and 3, movable switch 28 is supported within housing 10. Switch 28 mounted upon rod 26 includes electrical contacts 30 and 32. As illustrated in FIGS. 3 and 4, switch 28 has a miter portion 34 for complementally miter engagement with a corresponding longitudinal recess 36 in the housing wall. Suitable flexible electric wiring 40 may be connected to switch 28, so as to extend from contact points 30 and 32 to a suitable energization source 38 and deceleration warning indicator lamp 42.

Throttle rod projection 18 may have an inner conductive surface 20, such that when surface 20 is moved or reciprocated against switch 28, as upon deceleration movement of throttle rod 12, the electrical circuit is completed, thereby lighting warning lamp 42. Radial projection 16 which is attached to throttle rod, as at 22, repositions switch 28, each time the throttle rod is moved to the right as during acceleration of the vehicle. As the vehicle is accelerated by depressing the foot pedal, throttle rod 12 is moved to the right, as illustrated in FIG. 2. Projections 16 and 18 being secured to throttle rod 12 at points 22 and 24 are also moved to the right. Projection 16 moves switch 28 in the same direction along groove 36. Such movement is continuous, so long as the foot pedal is being depressed for vehicle acceleration.

When the vehicle operator releases pressure from the accelerator foot pedal, throttle rod 12 is urged to the left by means of tension spring 14 or the like, such that projections 16 and 18 also move to the left. After throttle rod 12 has moved a short distance to the left, projection 18 with its conductive surface 20 closes with movable switch 28 and contacts 30 and 32, so as to close the electrical circuit and energize deceleration warning lamp 42. Lamp 42 may be mounted within a vehicle rear brake light system, the rear turn indicators, a flasher warning system or may comprise a separate warning lamp independently, for example, in the rear window of the vehicle. Electrical circuit 40 will remain closed and the deceleration warning lamp 42 will remain lighted, so long as pressure is removed from the accelerator or foot pedal. As the foot pedal is depressed again for acceleration, the electrical circuit is discontinued or opened by throttle rod 12 being moved to the right and the release of conductive surface 20 from contacts 30, 32. Simultaneously with such release, projection 16, of course, urges switch 28 to the right. Movable switch 28 is thus repositioned for closing with lug 18 as pressure is released from the foot pedal accelerator.

As will be apparent, the sysem serves as a warning indicator for the following vehicle, such that the following vehicle driver may anticipate deceleration of the leading vehicle, as pressure is released from the foot pedal or accelerator of the leading vehicle. The warning should thus be helpful in congested area driving, such as city traffic, as well as highway traffic when a driver wishes to reduce speed by releasing pressure from the accelerator, such that the vehicle engine serves a braking function. Such release of pressure from accelerator foot pedal, by suitable bracket means (not illustrated) according to the present system alerts trailing vehicle drivers to deceleration of the leading vehicle. Also, of course, the deceleration warning system would provide an additional safety factor in the event that there is a malfunction in the normal brake lighting system.

Manifestly, the system may be adjusted mechanically so as to indicate deceleration upon minimal release of pressure from the accelerator. This system does not require friction fit of parts, complex machining or fitting of the radial projections, and switching elements which with the exception of the electrical contacts may be cast or molded in plastic.

I claim:

1. A deceleration warning indicator adapted for use in automotive vehicles of the type having a throttle rod extending intermediate an accelerator foot pedal and the engine carburetor comprising:

A. An electrical circuit including a deceleration warning lamp and an energization source;

B. A housing supported within the vehicle such that an intermediate portion of the throttle rod extends through said housing;

C. At least two radial projections longitudinally spaced from each other and extending from said intermediate portion of throttle rod within said housing, one of said projections having a conductive surface; and D. A movable switch within said electrical circuit, said switch being reciprocably mounted upon a stationary rod in said housing and intermediate said radial projections so as to be closable with said conductive surface upon deceleration movement of said throttle rod; and said switch having a laterally extending miter portion complementally engagable with a recess in said housing wall.

* * * * *